March 24, 1970 R. R. ECKENBRECHT 3,502,797

SOLID STATE COLOR KILLER CIRCUIT FOR COLOR TELEVISION RECEIVERS

Filed Feb. 24, 1967

INVENTOR.
ROBERT R. ECKENBRECHT

BY

ATTORNEY

United States Patent Office 3,502,797
Patented Mar. 24, 1970

3,502,797
SOLID STATE COLOR KILLER CIRCUIT FOR COLOR TELEVISION RECEIVERS

Robert R. Eckenbrecht, East Bethany, N.Y., assignor to Sylvania Electric Products Inc., a corporation of Delaware Filed Feb. 24, 1967, Ser. No. 618,418
Int. Cl. H04n *9/48*
U.S. Cl. 178—5.4 9 Claims

ABSTRACT OF THE DISCLOSURE

Color killer circuitry utilizing solid state semiconductor devices for color television receivers which have sharper switching characteristics and increased sensitivity providing reliable color killer action for monochrome signals without adversely affecting receiver operation for weak color signals.

BACKGROUND OF THE INVENTION

This invention relates generally to television receivers capable of receiving both color and monochrome broadcast signals, and more particularly to improved circuitry operative in response to the broadcast signal to adapt the receiver for either color or monochrome image reproduction.

Under the standards presently adopted in the United States, color television receivers must be capable of receiving and reproducing monochrome broadcasts as well as receiving and reproducing color broadcasts. The composite color signal includes a chrominance component and a luminance component, the latter being comparable to a monochrome signal representing the brightness variations of the image. The chrominance component consists of a subcarrier wave and its modulation sidebands modulated in phase to represent hue and in amplitude to represent color intensity. In addition the composite color signal contains horizontal and vertical synchronizing pulses, and synchronizing bursts of the color subcarrier. In transmission the color subcarrier is suppressed, making it necessary to reproduce the subcarrier at the receiver to permit demodulation of the chrominance components. Therefore, the synchronizing bursts of the color subcarrier are utilized to control a subcarrier oscillator in the receiver operative to provide the desired continuous wave signal for subcarrier reinsertion.

In a color television receiver, after amplification and detection of the composite color signal, the luminance and chrominance components are separated and applied to luminance and chrominance channels, respectively, of the receiver for further signal processing. The synchronizing bursts of the color subcarrier are also applied to the chrominance section of the receiver.

This configuration renders the color television receiver capable of reproducing either monochrome or color signal broadcasts. For a color broadcast, the luminance and chrominance signals are processed through their respective channels and combined at the picture tube to produce the color image. For a monochrome broadcast, the monochrome signal is processed in normal fashion through the luminance channel of the receiver and is applied to the picture tube to recreate the black and white image. However, in the absence of a color signal, it is necessary to disable the chrominance channel to avoid spurious color in the picture. This function is accomplished using color killer circuitry which is operative in response to an absence of color signals to cut-off one of the stages of the chrominance channel.

For optimum circuit operation the color killer functions as an on/off switch; that is, the chrominance channel is cut off when no color signal is present and fully on when a color signal is received. However, it has been found that prior art color killer circuits do not provide optimum operation, especially when relatively weak color signals are received. This is largely due to the fact that the prior art circuits do not have sharp switching characteristics. Therefore, when signals approach the switching level, the circuit operation becomes sporadic resulting in severe degradation of weak color signal performance. This sporadic operation may appear as so-called "colored snow" in the reproduced picture or it may be found that the color in the picture gradually fades out. Efforts to improve the switching characteristics of the color killer circuit operation have yielded improved switching, but at the penalty of decreased noise immunity. Furthermore, previous attempts to modify the color killer circuitry have not always been readily compatible with existing system designs, often requiring additional circuitry or modifications to existing circuitry.

Accordingly, it is an object of this invention to provide improved color killer circuitry for color television receivers capable of receiving either color or monochrome broadcast signals.

Another object of this invention is to provide improved color killer circuitry of economic design which is readily compatible with existing color receiver systems.

A further object of this invention is to provide an improved color killer circuit having improved switching characteristics, utilizing solid state semiconductor devices for increased reliability.

SUMMARY OF THE INVENTION

According to one aspect of the invention, the color killer circuit utilizes a transistor amplifier which is biased off when color signals are received and is biased on when color signals are absent. Control pulses applied to the collector circuit of the transistor amplifier are operative to develop a negative output whenever the transistor amplifier is biased on. This negative voltage is applied to a selected stage in the chrominance channel to thereby disable the chrominance channel and prevent spurious color signals from reaching the picture tube. When the transistor amplifier is nonconducting, no such negative output voltage is obtained and the chrominance channel remains fully operative.

DESCRIPTION OF THE PREFERRED EMBODIMENTS

For a better understanding of the present invention, together with other and further objects, advantages and capabilities thereof, reference is made to the following disclosure and appended claims in connection with the above-described drawing.

Figure 1:
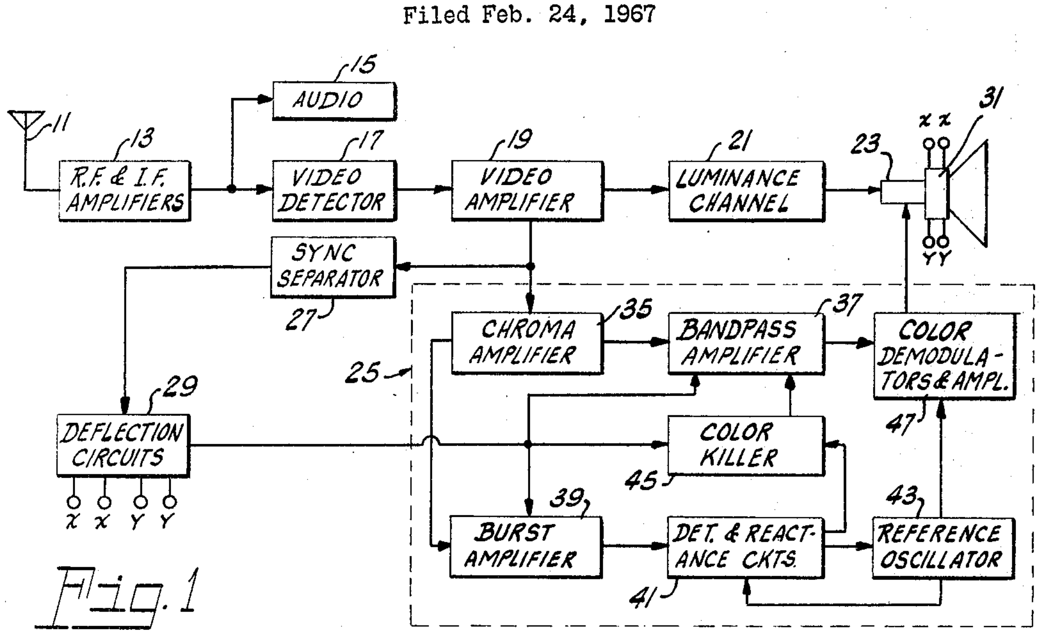
FIG. 1 is a block diagram of a television receiver capable of receiving and reproducing either color or monochrome signal broadcasts embodying the present invention.

Referring first to the block diagram of FIG. 1, the composite color signal received in the antenna 11 is applied to the RF, IF amplifier circuitry 13. At the output of the IF amplifier, the audio signal components are applied to the audio channel 15 and the video components, after detection by the video detector 17 are applied to a video amplifier 19. In the video amplifier the luminance components are separated from the composite video signal and are coupled to the luminance channel 21, the output of which is applied to the cathode ray tube 23. The remaining components of the composite video signal are applied to the chrominance channel 25 and a sync separator circuit 27. The sync circuitry separates the deflection synchronizing pulses from the other signal components and applies these pulses to suitable deflection circuitry 29. The deflection circuitry develops the horizontal and vertical deflection signals, X and Y, which are applied to the deflection yoke 31 mounted on the cathode ray tube 23 to accomplish the necessary scanning function.

The input to the chrominance channel 25 includes the chrominance signal components and the subcarrier color burst synchronizing signal which are applied to the input of a chroma amplifier. After amplification in the chroma amplifier, the signals are applied to a bandpass amplifier 37 and a burst amplifier 39. The burst amplifier selectively amplifies the subcarrier color burst signal which is then applied to the detector and reactance circuits operate in conjunction with a reference oscillator 43 to keep the reference oscillator locked in phase with the subcarrier color burst signal. In addition, the detector circuits 41 develop direct current voltages the magnitude of which are determined by the presence or absence of the subcarrier color burst signal and these D.C. voltages are applied to the input of the color killer circuit 45.

The output from the bandpass amplifier 37 contains only the chrominance signal components which are coupled to the color demodulator circuitry 47, which also receives a signal input from the reference oscillator 43. The demodulator circuits develop the appropriate color signals which are suitably applied to the picture tube 23 to permit reproduction of the color image. The output of the color killer circuit 45 is applied to the bandpass amplifier 37 and operates to cut off the bandpass amplifier when no color signals are present.

Figure 2:
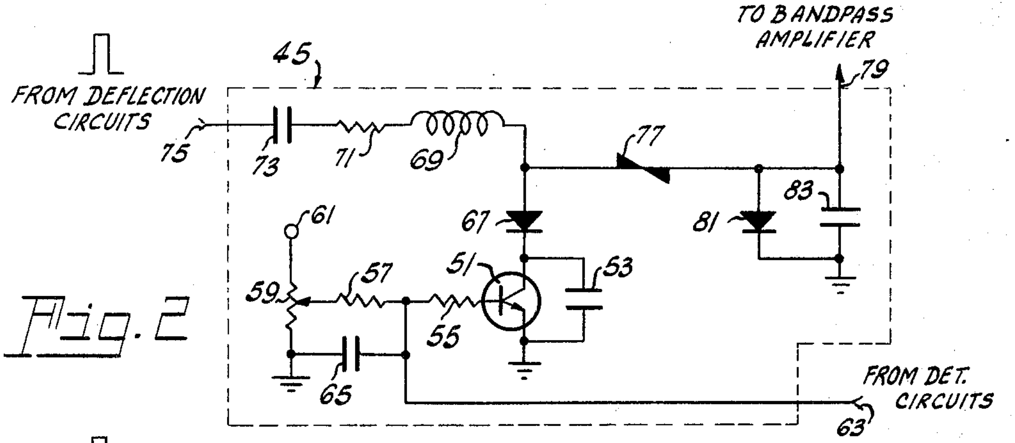
FIG. 2 is a schematic circuit diagram of a color killer circuit according to the present invention.

Referring now to FIG. 2, there is shown one embodiment of the color killer circuit 45 according to the invention. The circuit includes a transistor 51 connected in the common emitter configuration with a capacitor 53 connected between its emitter and collector electrodes. Two resistors 55, 57 are connected in series between the base electrode of the transistor and the center top of a potentiometer 59, the potentiometer being connected between a source of bias potential as represented by the terminal 61 and ground. The junction of resistor 55 and 57 is connected to an input terminal 63 from the detector circuits 41 and to ground by a capacitor 65. A series string consisting of a diode 67, a coil 69, a resistor 71 and a capacitor 73 is connected between the collector electrode of the transistor 51 and an input terminal 75 which is adopted to receive pulses from the deflection circuits 29. A voltage dependent resistor (VDR) 77 is placed between the junction of the diode 67 with the coil 69 and an output terminal 79 to the bandpass amplifier 37. A diode 81 and a capacitor 83 are connected in parallel between output terminal 79 and ground.

In operation, the circuit of FIG. 2 functions in the following manner. In the presence of a color signal, the input from the detector circuits 41 reverse biases the base to emitter junction of the transistor 51, such that when the positive horizontal pulse from the deflection circuits 29 is applied to the input terminal 75, the pulse cannot pass through the transistor 51 but rather is applied to the VDR 77. Due to its non-linear characteristics, the VDR acts as a series rectifier, causing a positive voltage to be developed on the capacitor 83. However, the diode 81 is operative to keep the control electrode in the bandpass amplifier from going positive.

When there is no color signal present, the voltage input from the detector circuits 41 forward biases the base to emitter junction of the transistor 51. Therefore, when the horizontal pulse from the deflection circuits 29 is applied to input terminal 75, the pulse current passes through the transistor and not through the VDR 77, so that the capacitor 83 does not acquire a positive charge. At the completion of the horizontal pulse, capacitor 73 has become charged, and discharges through the resistor 71, coil 69 and the VDR 77, thereby developing a negative voltage on the capacitor 83 which is applied to the control electrode of the bandpass amplifier 37. This negative voltage renders the bandpass amplifier 37 nonconducting such that noise signals which may be present do not cause the appearance of colored snow in the reproduced monochrome image.

Using a high beta transistor 51, the base to emitter, junction requires only a few tenths of a volt to bias it from cut-off to saturation, so the sharpness of the switching action is vastly improved. As a result, even weak color signals are adequate to maintain the transistor 51 cut-off and hence weak color signal operation does not suffer. The potentiometer 59 is utilized to establish the switching level of the transistor 51 to thereby compensate for other circuit variations. For example, when a minimum color signal is received, the potentiometer is adjusted to just cut out the color from the reproduced image and then backed off slightly until the color picture reappears.

Figure 3:
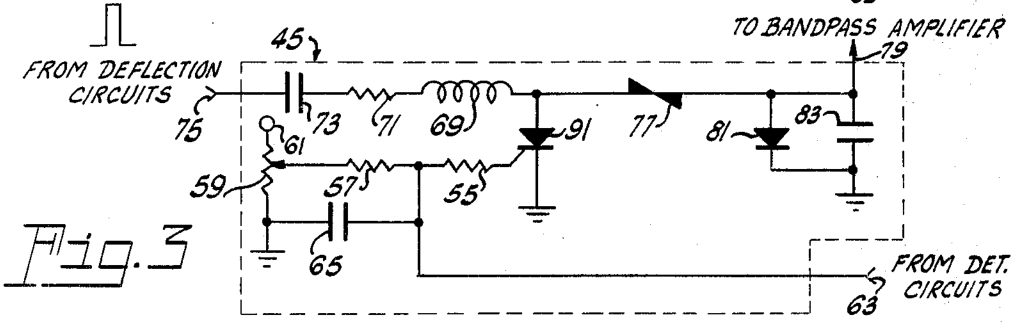
FIG. 3 is a schematic circuit diagram of an alternate embodiment of a color killer circuit according to the invention.

The circuit of FIG. 3 illustrates an alternate embodiment of the invention. In this embodiment, the transistor 51 is replaced by a silicon-controlled rectifier (SCR) 91, the cathode of which is connected to ground. In the circuit of FIG. 3, the diode 67 and the capacitor 53 are eliminated and the anode of the SCR is connected directly to the junction of the coil 69 and the VDR 77. The gate electrode of the SCR is connected via the resistor 55 to input terminal 63 from the deflection circuits 41. Except for the above-noted differences, the color killer circuit of FIG. 3 is the same as that of FIG. 2. Also, the operation of the circuit of FIG. 3 is essentially the same as the operation of the circuit of FIG. 2, providing a negative output voltage at terminal 79 when no color signal is present and providing a small positive output when a color signal is present.

Referring generally to the circuits of FIG. 2 and FIG. 3, it will be recognized that the circuits may be modified to suit particular system requirements or design preferences. For example, while the coil 69 performs a filtering action which provides a smoother direct current output voltage, in some instances it might be removed from the circuit without affecting circuit operation. Similarly, the capacitor 65, which enhances noise immunity may not be required in system where noise is not a problem. Also, in certain applications the VDR 77 may be replaced by a diode or possibly removed altogether from the circuit. It is to be understood that the present invention is not restricted to use in the system shown in FIG. 1, but rather is applicable to any color television receiver system requiring a color killer function.

It is therefore apparent that applicant has provided a color killer circuit which is of economic design and provides improved weak color system performance because of its sharper switching action. Furthermore, the circuit design makes it compatible with systems using either vacuum tubes or semiconductor devices. Inherently the circuit of the invention has improved reliability since it utilizes only solid state semiconductor devices.

While there have been shown and described what are at present considered the preferred embodiments of the invention, it will be obvious to those skilled in the art that various other changes and modifications may be made therein without departing from the scope of the invention as definied by the appended claims.

I claim:

1. In a television receiver for receiving both color and monochrome signal broadcasts and having deflection circuitry, a luminance channel, and a chrominance channel with said deflection circuitry operative to provide synchronizing pulses in response to received signals and said chrominance channel including a band-pass amplifier and a detector means providing a signal in excess of a predetermined level in response to a color signal and less than said predetermined level in response to a monochrome signal, a color killer circuit for enablement and disablement of said chrominance amplifier upon receipt of color and monochrome signals comprising in combination:

rectifier switch means;

first input terminal means including a capacitor coupling said deflection circuitry to said rectifier switch means;

output terminal means coupling said rectifier switch means and said first input terminal means to said bandpass amplifier means and by a capacitor to a potential reference level;

biasing means coupled to said rectifier switch means; and second input terminal means coupling said detector means to said biasing means and said rectifier switch means whereby a color signal from said detector means renders said rectifier switch means non-conductive causing development of a positive potential at said output terminal means due to signals from said deflection circuitry and conduction of said bandpass amplifier means and lack of a color signal causes conduction of said rectifier switch means effecting development of a negative charge on said capacitor of said first input terminal means and application of said negative charge to said bandpass amplifier means.

2. The combination of claim 1 wherein said rectifier switch means includes input, output, and control electrodes with said first input terminal means and said output terminal means coupled to said output electrode and said biasing means and said second input terminal means coupled to said control electrode.

3. The combination of claim 1 wherein said rectifier switch means is in the form of a silicon controlled rectifier.

4. The combination of claim 1 wherein said rectifier switch means is in the form of a series connected diode and transistor.

5. The combination of claim 1 wherein said output terminal means includes a voltage dependent resistor coupling said first input terminal means to said chrominance amplifier means and said capacitor.

6. The combination of claim 1 wherein said output terminal means includes a parallel coupled resistor and diode coupling said first input terminal means to said chrominance amplifier means and said capacitor.

7. The combination of claim 1 including a diode shunting said capacitor of said output terminal means.

8. The combination of claim 3 including a capacitor shunting the input and output electrodes of said transistor.

9. The combination of claim 4 including a resistor and coil in series connection with said capacitor of said first input terminal means.

References Cited

UNITED STATES PATENTS

| | | |
|---|---|---|
| 2,736,765 | 2/1956 | Lohman et al. |
| 2,894,061 | 5/1956 | Oakley et al. |
| 3,272,915 | 9/1966 | Theriault. |

ROBERT L. GRIFFIN, Primary Examiner

ALFRED H. EDDLEMAN, Assistant Examiner